US006962091B2

(12) United States Patent
Lukas

(10) Patent No.: US 6,962,091 B2
(45) Date of Patent: Nov. 8, 2005

(54) SYSTEM AND METHOD FOR MEASURING A HORIZONTAL DEVIATION OF A LOAD RECEIVING ELEMENT

(75) Inventor: Gunther Lukas, Parustein (DE)

(73) Assignee: Krusche Lagertechnik AG (DE)

( * ) Notice: Subject to any disclaimer, the term of this patent is extended or adjusted under 35 U.S.C. 154(b) by 0 days.

(21) Appl. No.: 10/705,628

(22) Filed: Nov. 10, 2003

(65) Prior Publication Data

US 2004/0149056 A1 Aug. 5, 2004

Related U.S. Application Data

(63) Continuation of application No. PCT/EP02/05102, filed on May 8, 2002.

(30) Foreign Application Priority Data

May 8, 2001 (DE) ........................................ 101 22 142

(51) Int. Cl.[7] ......................... B66C 13/16; B66F 17/00; G01B 21/00; G01B 7/00; G01M 19/00

(52) U.S. Cl. ........................ 73/865.9; 212/276; 701/50; 702/113; 702/158

(58) Field of Search ........................... 73/865.9, 862.56; 701/50, 124; 702/41, 43, 113, 150–151, 154–155, 158; 212/272, 276–277, 282

(56) References Cited

U.S. PATENT DOCUMENTS 3,638,211 A * 1/1972 Sanchez ................. 212/277 X
3,740,534 A * 6/1973 Kezer et al. .................. 701/50
3,997,071 A * 12/1976 Teach ..................... 212/276 X
4,352,460 A * 10/1982 Purtell ........................... 239/1
5,550,733 A * 8/1996 Yun et al. ............... 212/272 X
5,785,191 A * 7/1998 Feddema et al. ........... 212/275
5,961,563 A * 10/1999 Overton ....................... 701/50
6,496,765 B1 * 12/2002 Robinett et al. .............. 701/50
2004/0026349 A1 * 2/2004 Colgate et al. ............. 212/284

FOREIGN PATENT DOCUMENTS

DE 1756441 * 4/1970 ........... B66C/13/06
GB 2285250 A * 7/1995 ........... B66F/17/00
JP 58061429 A * 4/1983 ............ G01H/3/00
JP 58162811 A * 9/1983 ................. 702/158

* cited by examiner

*Primary Examiner*—Thomas P. Noland
(74) *Attorney, Agent, or Firm*—St. Onge Steward Johnston & Reens LLC

(57) ABSTRACT

The aim of the invention is to provide a system and a method which surmounts the problems of prior art. According to the inventive system and method for measuring horizontal deviation of a load receiving element in relation to a position of a hoist traveling trolley, the load receiving element is suspendedly arranged on a plurality of supporting cables on the hoist traveling trolley and least two cable length sensors are provided, the sensors being operatively connected to a data processing device, preferably a processor. The cables of the at least two cable length sensors are disposed between the hoist traveling trolley and the load receiving element in such a way that a computer unit which is connected to the data processing device determines the horizontal deviation of the load receiving element in relation to the position of the hoist traveling trolley for the length of the respective cables of the cable length sensors.

11 Claims, 2 Drawing Sheets

SYSTEM AND METHOD FOR MEASURING A HORIZONTAL DEVIATION OF A LOAD RECEIVING ELEMENT

RELATED APPLICATION

This application is a continuation of pending International Patent Application No. PCT/EP02/05102 filed May 8, 2002, which designates the United States and claims priority of pending German Application No. 10122142.8 filed May 8, 2001.

BACKGROUND OF THE INVENTION

The aim of the present invention is to provide a system from a horizontal deviation of a load receiving element in relation to a position of a hoist travelling trolley, wherein the load receiving element being suspendedly arranged on a plurality of supporting cables on the hoist travelling trolley, as well as a method for measuring a horizontal deflection of a load receiving element in relation to a position of a hoist travelling trolley, wherein the load receiving element being suspendedly arranged on a plurality of supporting cables on the hoist travelling trolley.

During the transportation of loads by bridge crane or gantry crane, ship unloader, girder bridge cranes, as well as coil and steel store gantry cranes, loads are regularly lifted from a location A at a level of $h_0$ to a transport level of $h_1$, whereupon they are transported to a destination B at a height of $h_2$ by a predetermined and normally time-optimized route.

In the case of all afore mentioned means of transport, a so-called hoist travelling trolley is provided on a cross beam on which, connected by supporting cables, load receiving elements such as gripping devices for receiving loads, for example containers, pallets and the like are arranged.

After receiving the load at location A, a horizontal movement of the hoist travelling trolley is regularly effected, wherein, due to the inertia, the loads suspended from the cables are accelerated or respectively decelerated in relation to the hoist travelling trolley in a delayed fashion. These acceleration or deceleration processes lead to a horizontal deviation of the load receiving element in relation to the position of the hoist traveling trolley. This deviation occurs regularly during transportation of the loads suspended from the supporting cables, with the consequence that an undesirable oscillation of the loads attached to the supporting cables will be initiated during a steady movement of the hoist traveling trolley.

One of the constant tasks of a crane operator, therefore, is to counteract these oscillatory movements. A practised and attentive crane operator will achieve this through skillful countersteering during the transport movement. If, however, the operator is unpractised or unattentive, the transportation operations and handling times may be considerably extended. In the worst case, there will be a higher risk of collisions and accidents.

There are known oscillation damping devices by CePLuS in Magdeburg which use high-performance cameras with microprocessors for measuring a horizontal deviation of the load receiving element. These high-performance cameras are mounted to a hoist travelling trolley and measure the movements of the loads so they can adapt the velocity of the hoist travelling trolley while traversing in order to prevent undesirable oscillation of the loads from occurring.

Reflectors are attached to the load receiving element in order to measure the deviation of the load receiving element. The camera mounted on the hoist travelling trolley is directed downwards, i.e. in the direction of the load receiving element, and determines the position of the reflector relative to the hoist travelling trolley. The deviation of the load receiving element is computed from this position data for the reflector.

A drawback of the CeSAR system by CePLuS has been that the time intervals for determining the deviation are too large for realtime dynamic control, and further, the resolution with regard to the accuracy of measurement of the camera measurement system is insufficient to meet the demands of the realtime dynamic control. In addition to this detrimental system data, the overall size of the CeSAR oscillation damping system has proved to be disadvantageous, since the reflectors which must be attached to the load receiving element have unfavourable dimensions. A further drawback of the CeSAR system is the limited field of view if at least a certain degree of measurement accuracy is required to be achieved, as the accuracy of measurement of the camera lens correlates to the horizontal field angle. A large horizontal field angle requires, therefore, a so-called wide angle lens which, however, is detrimental to image resolution and, ultimately, accuracy of measurement.

One more drawback of the CeSAR system is the frequency of maintenance required by the optical devices. This is because during usage in conventional storage environments, a certain degree of contamination of the racks, goods to be and, consequently, the means of transport is to be expected at regular intervals, with the result that the optical devices, such as the camera lens, will have to be cleaned frequently.

SUMMARY OF THE INVENTION

The aim of the present invention, therefore, is to provide a system and a method which surmount the problems of prior art.

This aim is performed by a system and a method according to the invention with the characteristics as respectively summarized in the appended claims of the invention.

In the case of a system according to the invention for measuring a horizontal deviation of a load receiving element in relation to a position of a hoist travelling trolley, wherein the load receiving element being suspendedly arranged on a plurality of supporting cables on the hoist travelling trolley, there are at least two cable length sensors provided, which are operatively connected to a data processing means, preferably a processor, wherein the cables of the at least two cable length sensors are disposed between the hoist travelling trolley and the load receiving element in such a way that a computer unit connected to the data processing means determines the horizontal deviation of the load receiving element in relation to a position of a hoist travelling trolley for the length of the respective cables of the cable length sensor.

Particularly advantageous are the small dimensions of the cable length sensors and their anchorage points, the high accuracy of measurement and sampling rate as well as the high ease of maintenance of the system according to the invention.

The method according to the invention for measuring a horizontal deviation of a load receiving element in relation to a position of a hoist travelling trolley, wherein the load receiving element being suspendedly arranged on a plurality of supporting cables on the hoist travelling trolley, involves the following steps:

Measurement of a first diagonal distance between the rear part of the hoist travelling trolley and a front part of the load receiving element and simultaneous measurement of a second diagonal distance between a front part of the hoist travelling trolley and a rear part of the load receiving element;

Transmittal of the two measured values to an electronic data processing means;

Insertion of the two measured values into a predetermined algorithm stored in a computer unit connected to the electronic data processing means;

Determination of an initial value which is equivalent to the horizontal deviation of the load receiving element in relation to the hoist travelling trolley.

The system according to the invention is based on the realization that when using at least two cable length sensors which are disposed respectively on the hoist traveling trolley and/or respectively on the load receiving element, the horizontal deviation of the load receiving element effectuates a shortening of the length of cable in the case of at least one of the cable length sensors, wherein this horizontal deviation effectuates a lengthening of the length of cable in the case of at least one other the cable length sensor. To this effect, the at least two cable length sensors are advantageously disposed on the hoist traveling trolley or respectively on the load receiving element in such a way that the two cables of at least two of the cable length sensors are intersecting.

Such an intersection of the at least two cables is achieved by one of the at least two cable length sensors being arranged in a front part of the hoist traveling trolley or the load receiving element wherein the other of the at least two cable sensors is arranged in a rear part of the hoist travelling trolley or the load receiving element and the anchorage point of the respective cables is extended in a diagonal fashion from the respective front part to the respective rear part and from the hoist travelling trolley to the load receiving element. With regard to this type of guying, it is immaterial whether the cable length sensor is arranged on the same side of the hoist travelling trolley or the load receiving element, as long as at a least physical intersection can be assured.

By this method of guying the at least two cables and the cable length measurement of the cable length sensor according to the invention, the horizontal deviation of the load receiving element is exactly determined by using simple trigonometric relationships stored in an algorithm in a computer unit.

As the angle of deviation is preferably required for further calculations of the hoist travelling trolley/load receiving element, the angle f deviation stretched between the verticals and the supporting cables is determined in a second mathematical step, which likewise involves using simple trigonometric relationships. The angle of deviation can then be used as an input variable for the subsequent calculations of the motion system of the travelling trolley/load receiving element.

It has proved particularly advantageous for the two cable length sensors to be arranged in such a way that a maximum possible distance exists between the two cable length sensors. Such a maximum distance produces the greatest possible difference in the lengths of the two cables and therefore increases the accuracy of the measurement result.

In a different embodiment of the system according to the invention, the two cables are not intersecting, but form a physical “V” shape, wherein the anchorage points of the respective cables are advantageously arranged at the apex of the physical “V” shape. Simple trigonometic relations are made in the same way in order to calculate the horizontal deviation.

In addition to the initially mentioned range of application of the prior art, there are also advantages in particular in using the system according to the invention in high bay warehouse systems.

BRIEF DESCRIPTION OF THE DRAWINGS

A preferred embodiment of the present invention will be explained in greater detail referring to the following figures.

DESCRIPTION OF PREFERRED EMBODIMENTS OF THE INVENTION

Figure 1:
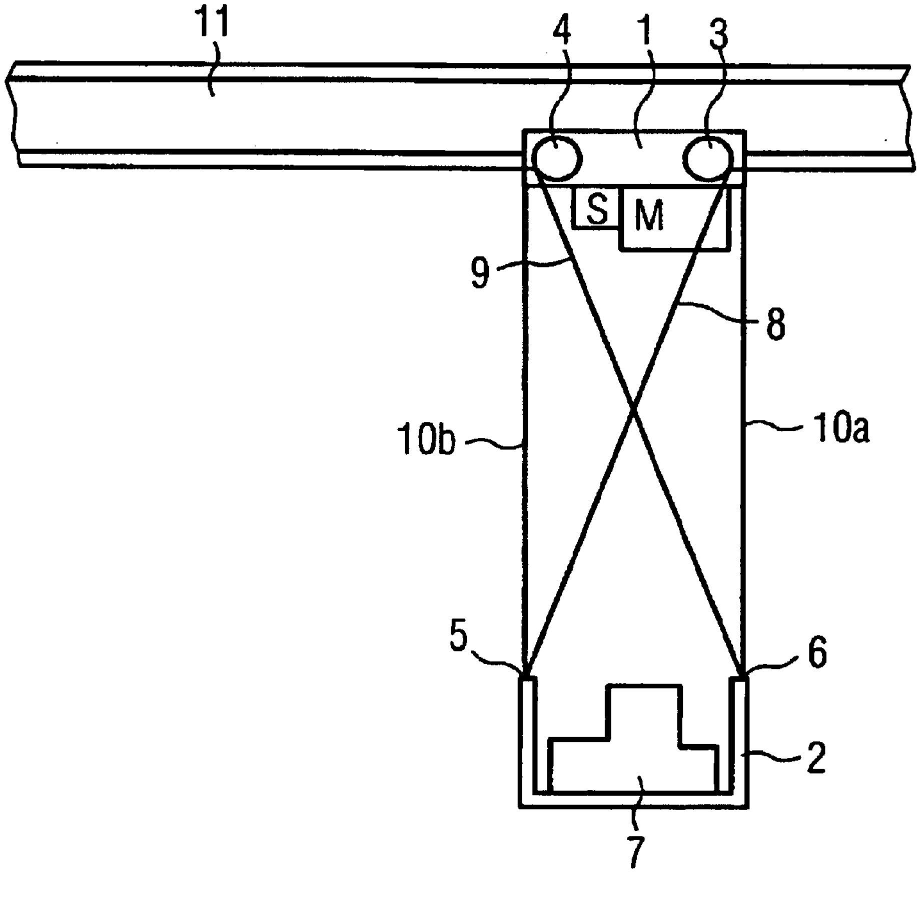
FIG. 1 shows a preferred embodiment of the system according to the invention.

FIG. 1 shows a system according to the invention consisting of a hoist travelling trolley 1 which is driven by a motor M for the purpose of transportation on rail 11. The power supply to the motor M is not shown. Motor M is controlled via a control unit S which is operatively connected to the motor M, but need not necessarily be arranged on the hoist travelling trolley. A data processing means, preferably a processor with a computer unit in which corresponding mathematical algorithms are stored, is integrated in or at least connected to the control unit. In the preferred embodiment shown in FIG. 1, there are arranged on the hoist travelling trolley 1 two cabl length sensors 3,4 whos cables 8, 9 are stretched diagonally downwards towards the load receiving element and are secured there at an anchorage point 5,6. The length of cables 8 and 9 is essentially the same in the rest position in FIG. 1 since, due to gravity, the load receiving element 2 is suspended perpendicularly by supporting cables 10*a* and 10*b* below the hoist travelling trolley, as well as by supporting cables 10*c* and 10*d*, which are not shown. The length of the supporting cables 10*c* and 10*d* is also controlled via motor M or via a special drive.

For measuring the length of cables, cable length sensors, for example, made by TR Electronic GmbH, which have an absolute or incremental encoder, are used.

Figure 2:
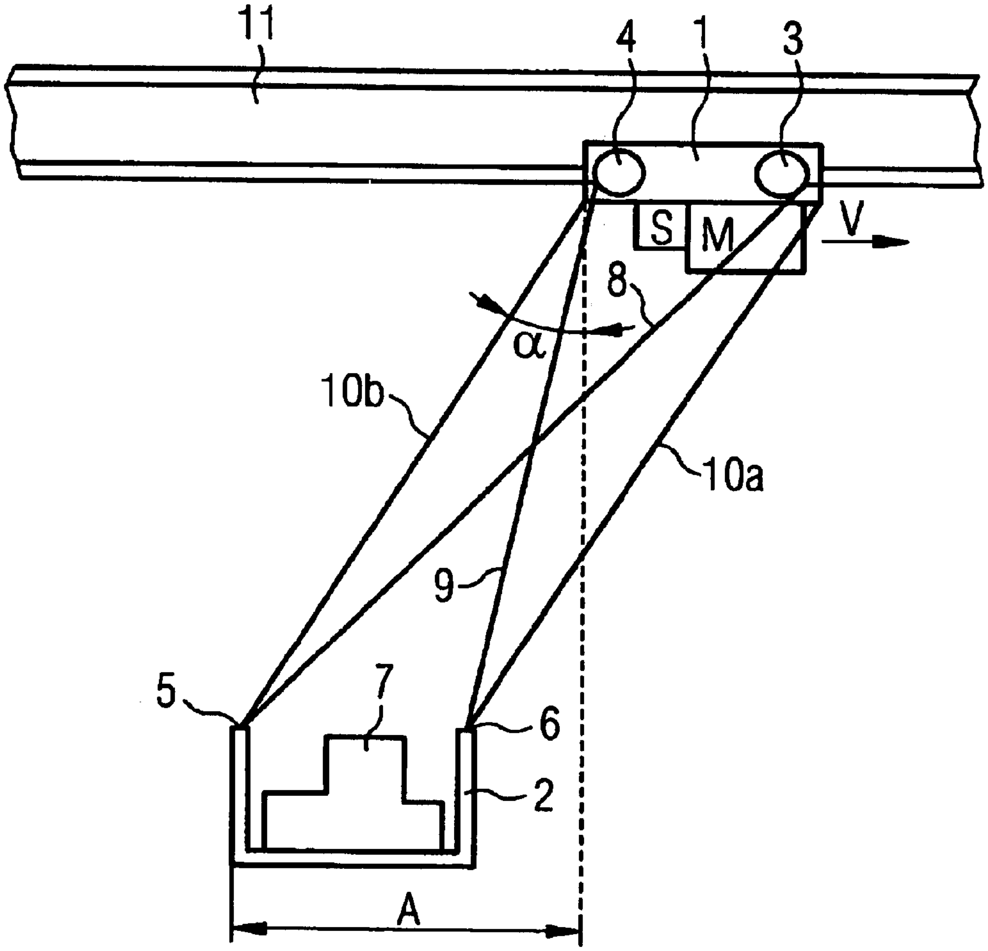
FIG. 2 shows the system according to the invention of FIG. 1 in motion.

When the hoist travelling trolley reaches a certain velocity or acceleration value, the inertia causes to supporting cables 10*c* and 10*d* to move against the direction of movement by a defined value A which is equivalent to a certain angle $\alpha$. FIG. 2 shows the movement position of the system according to the invention at a certain time instant in which the hoist travelling trolley has reached a velocity v. As a result of the horizontal deviation of load receiving element 2 by the amount A or respectively the angle $\alpha$ a change in the length of cables 8 and 9 of cable length sensors 3 and 4 occurs. This change in the lengths of the cables is measured by cable length sensors 3 and 4 and transmitted to the computer unit provided in electronic data processing means S. After having processed mathematical algorithms, the computer unit indicates the deviation A as a magnitude of absolute deflection or, alternatively, the angle $\alpha$ as an initial values. This value is then input into the control system to control motor M where it is processed accordingly, for example to suppress the oscillation of the load receiving element.

What is claimed is:

1. System for measuring a horizontal deviation of a load receiving element in relation to a position of a hoist travelling trolley, wherein the load receiving element being suspendedly arranged on a plurality of supporting cables on the hoist travelling trolley, the system comprising at least two cable length sensors which are operatively connected to a data processing means, the at least two cable length sensors having cables arranged between the hoist travelling trolley and the load receiving element in such a way that a computer unit which is connected to the data processing means determines a horizontal deviation of the load receiving element in relation to a position of the hoist travelling trolley for the length of the respective cables of the at least two cable length sensors.

2. System according to claim 1, wherein the cables of the at least two cable length sensors are arranged in such a way that the length of the cable of the first cable length sensor decreases compared to the state without horizontal alignment due to a horizontal deviation of the load receiving element, while at the same time the length of the cable of the second cable length sensor increases.

3. System according to claim 2, wherein the at least two cable length sensors are arranged in such a way that their cables are intersecting.

4. System according to claims 1, 2, or 3, wherein at least one of the cable length sensors is arranged on the hoist travelling trolley.

5. System according to claims 1, 2, or 3, wherein at least one of the cable length sensors is arranged on the load receiving element.

6. System according to claim 1, wherein the cable length sensors are not arranged on the same side of the hoist travelling trolley or the load receiving element.

7. System according to claim 1, wherein one of the at least two cable length sensors is arranged in a front part of the hoist travelling trolley and whose cable essentially extends diagonally to an anchorage point to a rear part of the load receiving element, whereas the other of the at least two cable length sensors is arranged at a rear part of the hoist travelling trolley and whose cable essentially extends diagonally to an anchorage point in a front part of the load receiving element.

8. System for measuring a horizontal deviation of a load receiving element in relation to a position of a hoist travelling trolley, wherein the load receiving element being suspendedly arranged on a plurality of supporting cables on the hoist travelling trolley, using a system according to claim 1, consisting of the steps:

measurement of a first diagonal distance between a rear part of the hoist travelling trolley and a front part of the load receiving element and simultaneous measurement of a second diagonal distance between a front part of the hoist travelling trolley and a rear part of the load receiving element;

transmittal of the two measured values to the electronic data processing means;

insertion of the two measured values into a predetermined algorithm stored in the computer unit connected to the electronic data processing means;

determination of an initial value which is equivalent to the horizontal deviation of the load receiving element in relation to the hoist travelling trolley.

9. Method for measuring a horizontal deviation of a load receiving element in relation to a position of a hoist travelling trolley, wherein the load receiving element being suspendedly arranged on a plurality of supporting cables on the hoist travelling trolley, using a system according to claim 1, consisting of the steps:

measurement of a first distance between the rear part of the hoist travelling trolley and a central part of the load receiving element and simultaneous measurement of a second distance between a front part of the hoist travelling trolley and the central part of the load receiving element;

transmittal of the two measured values to the electronic data processing means;

insertion of the two measured values into a predetermined algorithm stored in the computer unit connected to the electronic data processing means;

determination of an initial value which is equivalent to the horizontal deviation of the load receiving element in relation to the hoist travelling trolley.

10. Method according to claims 8 or 9, wherein the initial value is an angular value.

11. Use of at least two cable length sensors, according to a method of claims 8 or 9, for measuring a horizontal deviation of a load receiving element in relation to a position of a hoist travelling trolley, wherein the load receiving element being suspendedly arranged on a plurality of supporting cables on the hoist travelling trolley, the system comprising at least two cable length sensors which are operatively connected to the data processing means, the at least two cable length sensors (3, 4) having cables arranged between the hoist travelling trolley and the load receiving element in such a way that the computer unit which is connected to the data processing means determines the horizontal deviation of the load receiving element in relation to the position of the hoist travelling trolley for the length of the respective cables of the at least two cable length sensors.

* * * * *